United States Patent [19]

Yabusaki et al.

[11] Patent Number: 4,737,029
[45] Date of Patent: Apr. 12, 1988

[54] PHOTOMETER

[75] Inventors: Kenji Yabusaki, Kashiwa; Hitoshi Tozawa; Akira Noda, both of Tokyo; Takashi Ito, Ohmiya, all of Japan

[73] Assignee: Tokyo Kogaku Kikai Kabushiki Kaisha, Tokyo, Japan

[21] Appl. No.: 856,579

[22] Filed: Apr. 25, 1986

[30] Foreign Application Priority Data

Apr. 30, 1985 [JP] Japan ................... 60-92666

[51] Int. Cl.[4] ................... G01J 1/42
[52] U.S. Cl. ................... 356/225; 356/219; 356/226; 356/233
[58] Field of Search ............ 356/418, 419, 218, 219, 356/224–226, 229, 230, 233

[56] References Cited

U.S. PATENT DOCUMENTS 3,813,172  5/1974  Walker et al. ............ 356/319
3,818,198  6/1974  Walker et al. ............ 356/233

OTHER PUBLICATIONS

Walker, *Applied Optics*, vol. 11, No. 9, Sep. 1972, pp. 2060–2068.

*Primary Examiner*—F. L. Evans

*Attorney, Agent, or Firm*—Brumbaugh, Graves Donohue & Raymond

[57] ABSTRACT

A photometer is providing including light detecting means for detecting incident light and generating electric signals in response thereto as a measure of the incident light thereon, and optical means for guiding light to the light detecting means from a standard light source in a calibration mode and from an object, a photometric quantity of which is to be measured, in a measurement mode. Control means are adapted to generate calibration control signals for carrying out a calibration mode wherein a photometric quantity value Dstd of the standard light source and a measured value Rstd corresponding to the intensity of the standard light source detected by the light detecting means are stored in a memory, and light measurement control signals for carrying out a measurement mode wherein a photometric quantity value Rm corresponding to the photometric quantity of the object measured by the light detecting means is also stored in memory such that a CPU or similar computing means can communicate with the memory and compute a photometric quantity value R of the object according to the formula $$R = Rm \times (Dstd/Rstd).$$

6 Claims, 2 Drawing Sheets

PHOTOMETER

BACKGROUND OF THE INVENTION

The present invention relates to a photometer for measuring photometric quantity. More specifically, the present invention pertains to a photometer which is calibrated using a standard light source.

In general, a photometer has to be calibrated by reading out a photometric quantity (such as luminous flux, luminance, illuminance and so on) using a standard light source, and, where it is provided with a plurality of measurement ranges, these ranges have to be brought into proper correlation. Namely, the measurement values have to be made constant among all measured areas of an object with respect to the same photometric quantity, so as to precisely measure the photometric quantity. This correlation is accomplished by changing the measurement range and the measured area, which is done by changing density filters and the size of an aperture located at an imaging position of the objective, respectively.

Conventional photometers such as disclosed in U.S. Pat. No. 3,818,198 are so constructed that a photodetecting circuit includes a main impedance connected between a photoelectric element and an amplifier and a plurality of variable impedances connected with the main impedance. The number of the variable impedances is the same as the number of adjustment elements provided for adjusting the output of the photodetecting circuit. In such a photometer, the calibration and correlation are carried out by connecting a variable impedance of appropriate value with the main impedance.

It should, however, be noted that the above-mentioned photometer is very expensive because a plurality of variable impedances and means for connecting them with other parts must be provided. Also, the procedures for calibration and correlation are complicated, and it is difficult to precisely measure the photometric quality because the correlation must be made using a standard light source and an appropriate impedance among the variable impedances must be added to the main impedance at each measurement.

It is therefore an object of the present invention to provide a photometer which enables calibration and correlation without using any variable impedance.

Another object of the present invention is to provide a photometer in which the calibration and correlation can be carried out without following any specific procedure, so that it is possible to avoid degradation of measurement precision brought about by a change in the standard light source or vibration of the photometer.

SUMMARY OF THE INVENTION

According to present invention, the above and other objects can be accomplished by a photometer including light detecting means for detecting incident light and generating electric signals in response thereto as a measure of the incident light thereon, and optical means for guiding light to the light detecting means from a standard light source in a calibration mode and from an object, a photometric quantity of which is to be measured, in a measurement mode. Control means are adapted to generate calibration control signals for carrying out a calibration mode wherein a photometric quantity value Dstd of the standard light source and a measured value Rstd corresponding to the intensity of the standard light source detected by the light detecting means are stored in a memory, and light measurement control signals for carrying out a measurement mode wherein a photometric quantity value Rm corresponding to the photometric quantity of the object measured by the light detecting means is also stored in memory such that a CPU or similar computing means can communicate with the memory and compute a photometric quantity value R of the object according to the formula $R = Rm \times (Dstd/Rstd)$.

DESCRIPTION OF THE PREFERRED EMBODIMENT

Figure 1:
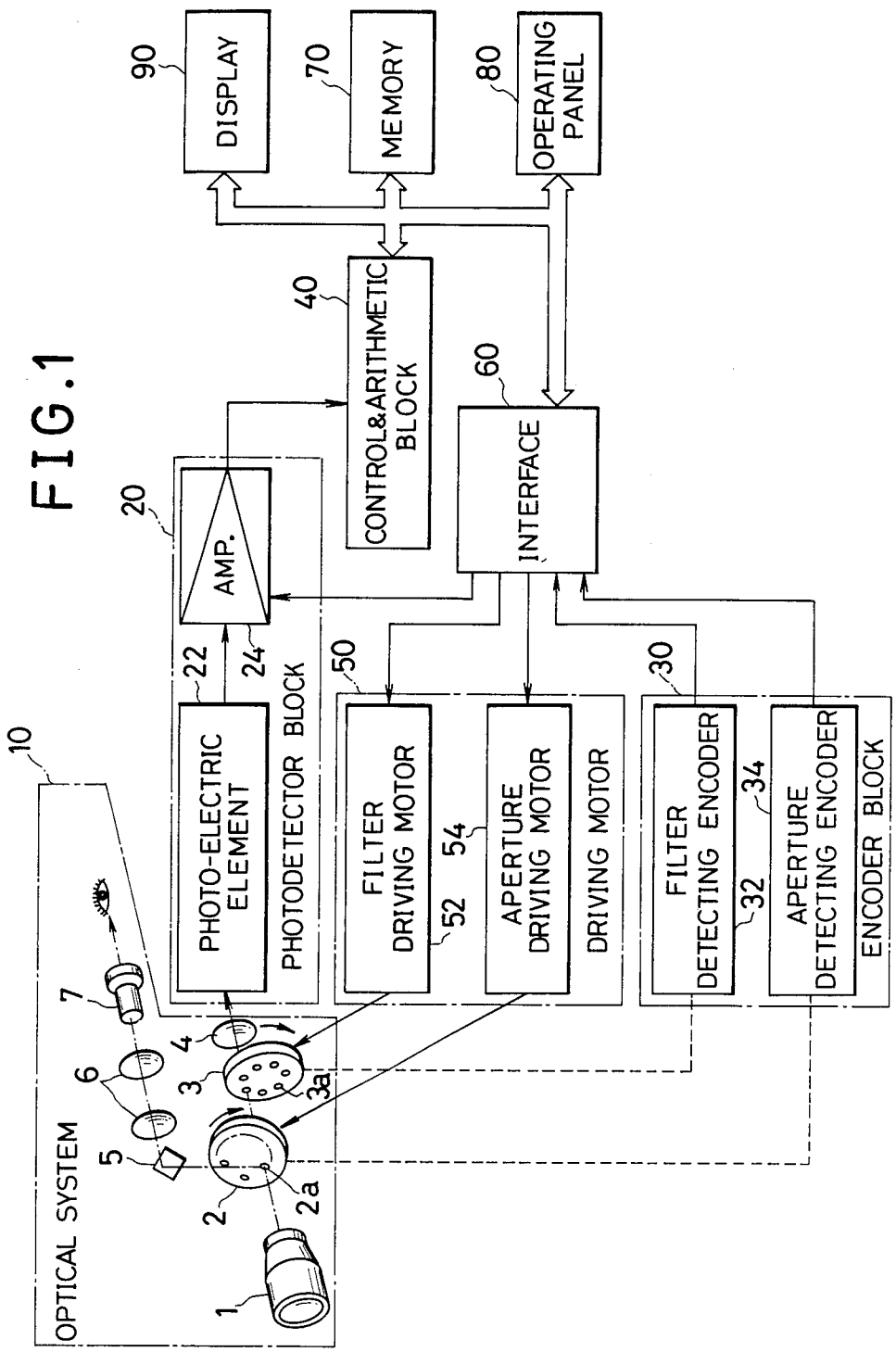
FIG. 1 is a block diagram showing the photometer in accordance with one embodiment of the present invention.

Referring now to the drawings, there is shown a photometer in which the present invention is embodied. FIG. 1 shows a block diagram of the photometer.

An optical system 10 comprises an objective lens 1 for forming an image of an object to be measured (not shown), a reflector 2 having a plurality of different-diameter apertures 2a at its periphery and located obliquely with respect to the optical axis of the objective lens 1 at the imaging position of the objective lens 1, a filter plate 3 rotatably located behind the reflector 2, and a relay lens 4 located behind the filter plate 3. The filter plate 3 is provided with a plurality of different-density filters 3a on the same circumference. The optical system 10 further comprises a reflector 5 positioned on the optical axis of light reflected by the reflector 2, a relay lens 6 and an eyepiece 7 located on the optical axis of light reflected by the reflector 5.

In the optical system 10, the image of the object is formed on the reflector 2 through the objective lens 1. The measured area of the object is defined by the aperture 2a set on the optical axis of the objective lens 1 from the image of the object, so that light emitted from the measured area of the object is passed through the aperture 2a and the filter 3a set on the optical axis of the objective lens 1. The image of the measured area is formed on a photoelectric element 22 described later. The light reflected by the reflector 2 is transferred to the eye of a measurer via the reflector 5, the relay lens 6 and the eyepiece 7, so that the measurer can observe the image of the object in which the measured area appears black.

An electrical system comprises an interface 60, a photodetector block 20, a driving motor block 50, an encoder block 30, a control and arithmetic block 40 connected with the photodetector block 20, a display connected with the interface 60 and the control and arithmetic block 40, a memory 70, and an operating panel 80. The interface 60 converts input signals into output signals appropriate for the elements connected with the output thereof. The photodetector block 20 has a photoelectric element 22 for receiving light from the optical system 10 so as to convert the light to electric signals, and an amplifier 24 for amplifying the output signal from the photoelectric element 22 in accordance with the output signal transferred from the control and arithmetic block 40 through the interface 60.

The driving motor block 50 has a driving motor 52 for driving the filter plate 3 and a driving motor 54 for driving the reflector 2, and it is controlled by control signals supplied from the control panel 80 and/or the control and arithmetic block 40 through the interface 60.

The encoder block 30 comprises a filter detecting encoder 32 for detecting the filter 3a put on the optical axis of the objective lens 1 and an aperture detecting encoder for detecting the aperture 2a put on the optical axis of the objective lens 1.

Figure 2:
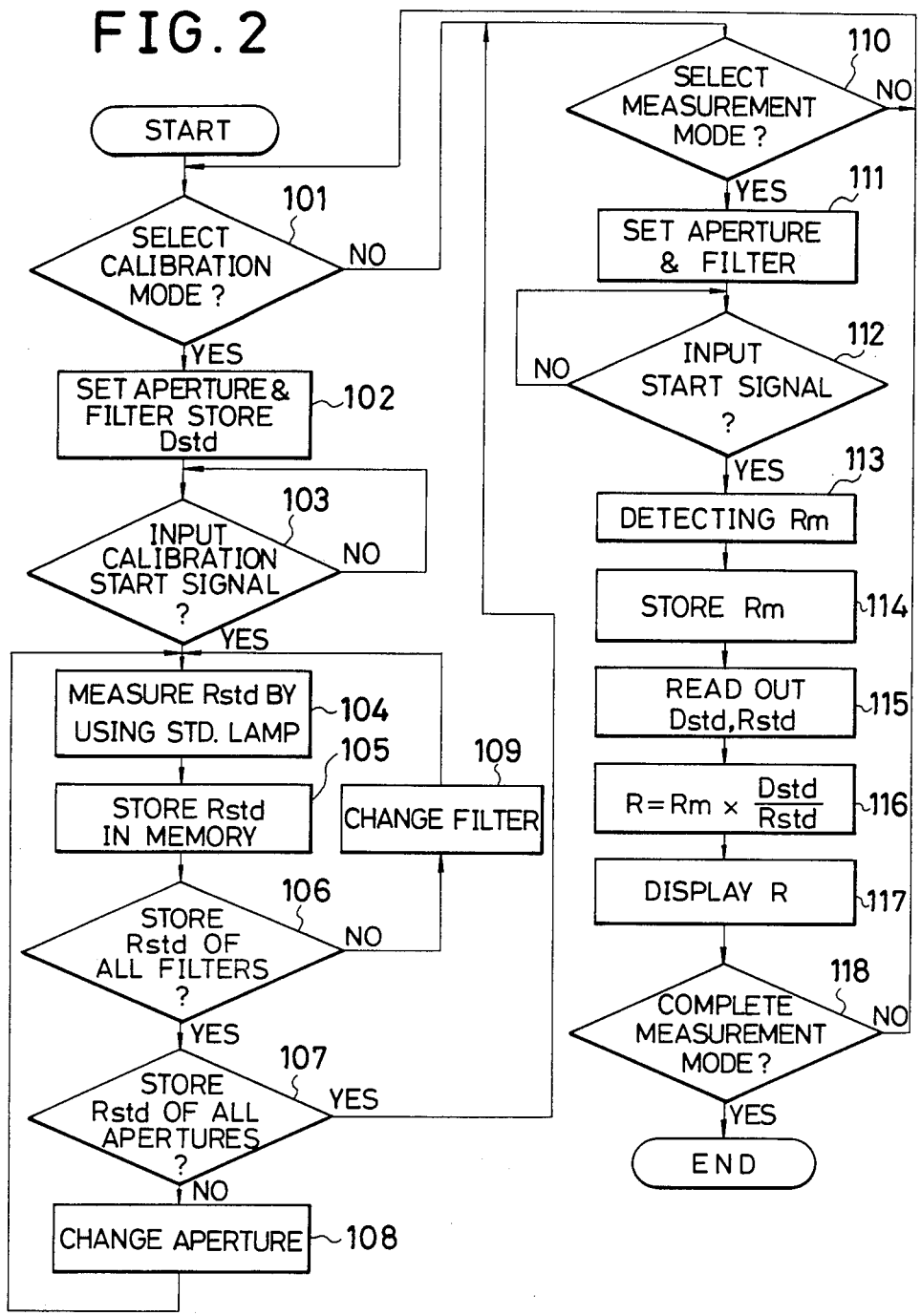
FIG. 2 is a flow chart showing the operation of the aforementioned embodiment.

FIG. 2 shows the functions of the control and arithmetic block 40, the display 90, the memory 70 comprising a nonvolatile storage device, and the operating panel 80. By means of the operating panel 80, the measurer selects either the calibration mode or the measurement mode using the values Rstd and Dstd which are obtained by measurement in the calibration mode. In calibration mode there is made a measurement for detecting the measured values corresponding to the intensity of the standard lamp to calibrate a scale, and in measurement mode there is made a measurement for detecting the luminance of the object or the photometric quantity of light reflected by the object.

If the calibration mode is selected, the measurer inputs luminance value of the standard lamp, and the values of Rstd with respect to all apertures 2a and filters 3a are determined. If the measurement mode is selected, the measurer inputs signals selecting the desired aperture 2a and the desired filter 3a through the operating panel 80.

The control and arithmetic block 40 determines whether the calibration mode is selected in step 101. If the calibration mode is selected, the driving motor block 50 is operated so as to first locate the predetermined aperture 2a and the predetermined filter 3a and store the value Dstd in the memory 70 in step 102.

In step 103, it is determined whether a signal for beginning calibration is supplied from the operating panel 80. If it is not supplied, there is a wait until the signal is supplied. When the signal is supplied, the measured value Rstd (corresponding to the intensity) of a standard lamp is measured in step 104, and the value Rstd is stored in the memory 70 in step 105. In step 106, it is determined whether the values Rstd of all the filters 3a have been measured. If not, in step 109 the filter 3a on the optical axis is changed, and the procedure reverts to the step 104.

When the values Rstd of all the filters 3a have been measured, it is determined in step 107 whether the values Rstd of all the filters 3a have been stored in the memory 70. If not, in step 108 the aperture 2a on the optical axis is changed and the procedure reverts to the step 104.

If it is determined that the values Rstd of all the apertures 2a have been stored in the memory 70 in step 107, or the calibration mode is not selected in step 101, the procedure advances to step 110 to determine whether the measurement mode is selected.

If not, the procedure reverts to the step 101. If the measurement mode is selected, the procedure advances to step 111 so that the desired aperture 2a and filter 3a are located on the optical axis in accordance with a command signal applied beforehand.

In step 112 it is determined whether a measurement beginning signal is supplied. If not, there is a wait until the signal is supplied. When the signal is supplied, the value Rm corresponding to the luminance of the measured area is measured in step 113. Then, in step 114 the value Rm is stored in the memory 70, and the values Dstd, Rstd and Rm in response to the aperture 2a and the filter 3a selected in step 111 are read out from the memory 70 in step 115.

In step 116, a computation according to the following formula is made using the values Dstd Rstd and Rm as read out in the step 115 so as to obtain a compensated luminance value R, $$R = Rm \times (Dstd/Rstd).$$

In step 117 the display 90 shows the luminance value R computed in the step 116. Then, it is determined whether all the measurement modes have been completed. If not, the procedure reverts to the step 101.

It should be understood that while the invention has been described with respect to a preferred embodiment, variations may be perceived by those skilled in the art without departing from the scope of the present invention as described by the claims appended hereto.

We claim:
1. A photometer comprising:
light detecting means for detecting incident light and generating electric signals in response thereto as a measure of the incident light thereon;
optical means for guiding light to said light detecting means from a standard light source in a calibration mode and from an object, a photometric quantity of which is to be measured, in a measurement mode;
memory means for storing measured photometric quantity values;
control means for generating calibration control signals for carrying out a calibration mode wherein a photometric quantity value Dstd of said standard light source and a measured value Rstd corresponding to the intensity of said standard light source detected by said light detecting means are stored in said memory means, and light measurement control signals for carrying out a measurement mode wherein a photometric quantity value Rm corresponding to the photometric quantity of said object measured by said light detecting means is stored in said memory means; and
computing means for communicating with said memory so that a photometric quantity value R of the object may be computed according to the formula

$$R = Rm \times (Dstd/Rstd).$$

2. A photometer in accordance with claim 1 wherein the light detecting means has a variable amplifier for measuring a plurality of measurement ranges, said memory means is adapted to store the values Rstd measured in each measurement range, and said computing means computes the photometric quantity value R using the value Rstd measured in a selected measurement range.

3. A photometer in accordance with claim 1 wherein said optical means includes a plurality of filters having different densities selectively located on an optical path thereof for passing a variable quantity of light therethrough, said memory means is adapted to store the values Rstd measured with each of said plurality of filters, and said computing means computes the value R using the value Rstd measured with respect to a selected filter located on said optical path.

4. A photometer in accordance with claim 1 wherein the optical means includes a disk having a plurality of apertures of different diameter which can be selectively located on an optical path thereof for changing the measured area of the object, said memory means is adapted to store the values Rstd measured with each of said plurality of apertures, and said computing means computes the values R using the value Rstd measured with respect to a selected aperture located on said optical path.

5. A photometer in accordance with claim 1 further comprising an operating panel for inputting said photometric quantity value Dstd and for generating initiation signals to instruct said control means to carry out either said calibration mode or said measurement mode.

6. A photometer in accordance with claims 1, 2, 3, 4 or 5 wherein said memory means comprises a nonvolatile storage device.

* * * * *